US008582174B2

(12) United States Patent
Minamikawa

(10) Patent No.: US 8,582,174 B2
(45) Date of Patent: Nov. 12, 2013

(54) MULTIFUNCTION APPARATUS WITH A PRINT PREPARATION OPERATION

(75) Inventor: Shunsuke Minamikawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 760 days.

(21) Appl. No.: 12/725,553

(22) Filed: Mar. 17, 2010

(65) Prior Publication Data

US 2010/0245866 A1      Sep. 30, 2010

(30) Foreign Application Priority Data

Mar. 27, 2009   (JP) .................................. 2009-079294

(51) Int. Cl.
   *G06K 15/02*      (2006.01)
   *G06K 15/00*      (2006.01)
(52) U.S. Cl.
   USPC ......................................... 358/1.9; 358/1.14
(58) Field of Classification Search
   None
   See application file for complete search history.

(56) References Cited

U.S. PATENT DOCUMENTS

| 5,550,637 | A | | 8/1996 | Murakami | |
|---|---|---|---|---|---|
| 6,163,383 | A | * | 12/2000 | Ota et al. | 358/1.1 |
| 8,085,415 | B2 | * | 12/2011 | Nagami | 358/1.14 |
| 2006/0245771 | A1 | | 11/2006 | Yamada | |
| 2008/0239400 | A1 | | 10/2008 | Yoshida | |
| 2008/0297825 | A1 | | 12/2008 | Hikichi | |

FOREIGN PATENT DOCUMENTS

| JP | 6282127 | * | 7/1994 |
|---|---|---|---|
| JP | A-06-282127 | | 10/1994 |
| JP | A-2000-324279 | | 11/2000 |
| JP | A-2001-028650 | | 1/2001 |
| JP | A-2003-162185 | | 6/2003 |
| JP | A-2006-010975 | | 1/2006 |
| JP | A-2006-071684 | | 3/2006 |
| JP | 2006-130779 A | | 5/2006 |
| JP | A-2006-305827 | | 11/2006 |
| JP | 2006-339779 A | | 12/2006 |
| JP | 2008-0102204 A | | 5/2008 |
| JP | 2008-207486 A | | 9/2008 |
| JP | A-2008-238459 | | 10/2008 |
| JP | A-2008-301346 | | 12/2008 |
| WO | WO2008/156179 | * | 12/2008 |
| WO | WO2009/130990 A1 | * | 3/2009 |

OTHER PUBLICATIONS

Official Action dated Feb. 15, 2011 received from the Japanese Patent Office in corresponding Japanese Patent Application No. JP 2009-079294.
Japanese Decision of Patent Grant dated Aug. 2, 2011 from related Japanese Application No. 2009-079294, together with an English language translation.

* cited by examiner

*Primary Examiner* — Barbara Reinier
(74) *Attorney, Agent, or Firm* — Scully, Scott, Murphy & Presser, P.C.

(57) ABSTRACT

A multifunction apparatus includes: an execution request acceptance section that accepts a request for executing a function; a determination section that determines whether or not the execution request is a function involving printing operation when the execution request acceptance section receives the execution request; and an execution section that performs print preparation operation when the determination section determines that the execution request does not correspond to the function involving printing operation.

4 Claims, 6 Drawing Sheets

FIG. 4

| USER NAME (ID) | PRINT FUNCTION | COPYING FUNCTION | FACSIMILE FUNCTION | SCAN FUNCTION |
|---|---|---|---|---|
| A | ○ | ○ | × | ○ |

○→: UTILIZATION ALLOWED
×→: UTILIZATION PROHIBITED

FIG. 5

| USER NAME (ID) | PASSWORD | PRINT FUNCTION | COPYING FUNCTION | FACSIMILE FUNCTION | SCAN FUNCTION |
|---|---|---|---|---|---|
| A | bro001 | ○ | ○ | × | ○ |
| B | bro002 | ○ | × | ○ | × |
| C | bro003 | × | × | ○ | ○ |
| D | b1r1o1 | × | × | ○ | × |
| E | b2r2o2 | × | ○ | × | × |
| F | b3r3o3 | × | ○ | × | × |

○→: UTILIZATION ALLOWED
×→: UTILIZATION PROHIBITED

MULTIFUNCTION APPARATUS WITH A PRINT PREPARATION OPERATION

CROSS REFERENCE TO RELATED APPLICATION

The present application claims priority from Japanese Patent Application No. 2009.079294, which was filed on Mar. 27, 2009, the disclosure of which is incorporated herein by reference in its entirety.

BACKGROUND

The present invention relates to a multifunction apparatus. An image output from a print section of a multifunction apparatus changes along with environmental changes, such as a temperature change and a humidity change, and changes in state, such as secular changes in components making up the print section. Accordingly, print preparation operation, such as calibration for correcting an output characteristic of a print section, is performed on condition that a predetermined number of sheets have passed or a predetermined period of time has elapsed since previous calibration was performed, etc.

SUMMARY

However, in a case where performance of calibration is requested at predetermined timing after previous print preparation operation, if the user makes a print request at this timing, the user will often be forced to wait for a much longer period of time because of performance of calibration operation.

The present invention has been conceived to solve the drawback and an object of the present invention is to provide a multifunction apparatus capable of reducing the chance of performance of print preparation operation which would be carried out immediately before making of a print request.

To achieve the object of the present invention, the exemplary embodiment of the present invention provides a multifunction apparatus comprising:

an execution request acceptance section that accepts a request for executing a function;

a determination section that determines whether or not the execution request is a function involving printing operation when the execution request acceptance section receives the execution request; and an execution section that performs print preparation operation when the determination section determines that the execution request does not correspond to the function involving printing operation.

The exemplary embodiment of the present invention further provides a multifunction apparatus comprising:

an input section that inputs user identification information;

an identification section that identifies a user by the input identification information;

a restriction section that imposes restrictions on utilization of a function according to the identified user; and an execution section that executes print preparation operation when the restriction section determines that utilization of the function involving printing operation is restricted.

BRIEF DESCRIPTION OF THE DRAWINGS

FIG. 4 is an example indication of information about restrictions on utilization of functions;

FIG. 5 is a table pertaining to information about restrictions on utilization of functions for an individual user;

DESCRIPTION OF EXEMPLARY EMBODIMENTS

A multifunction apparatus 1 having a print function, a copier function, a facsimile function, a scanner function, and others, is described as an exemplary embodiment of the present invention.

Mechanical Configuration of the Multifunction Apparatus

Figure 1:
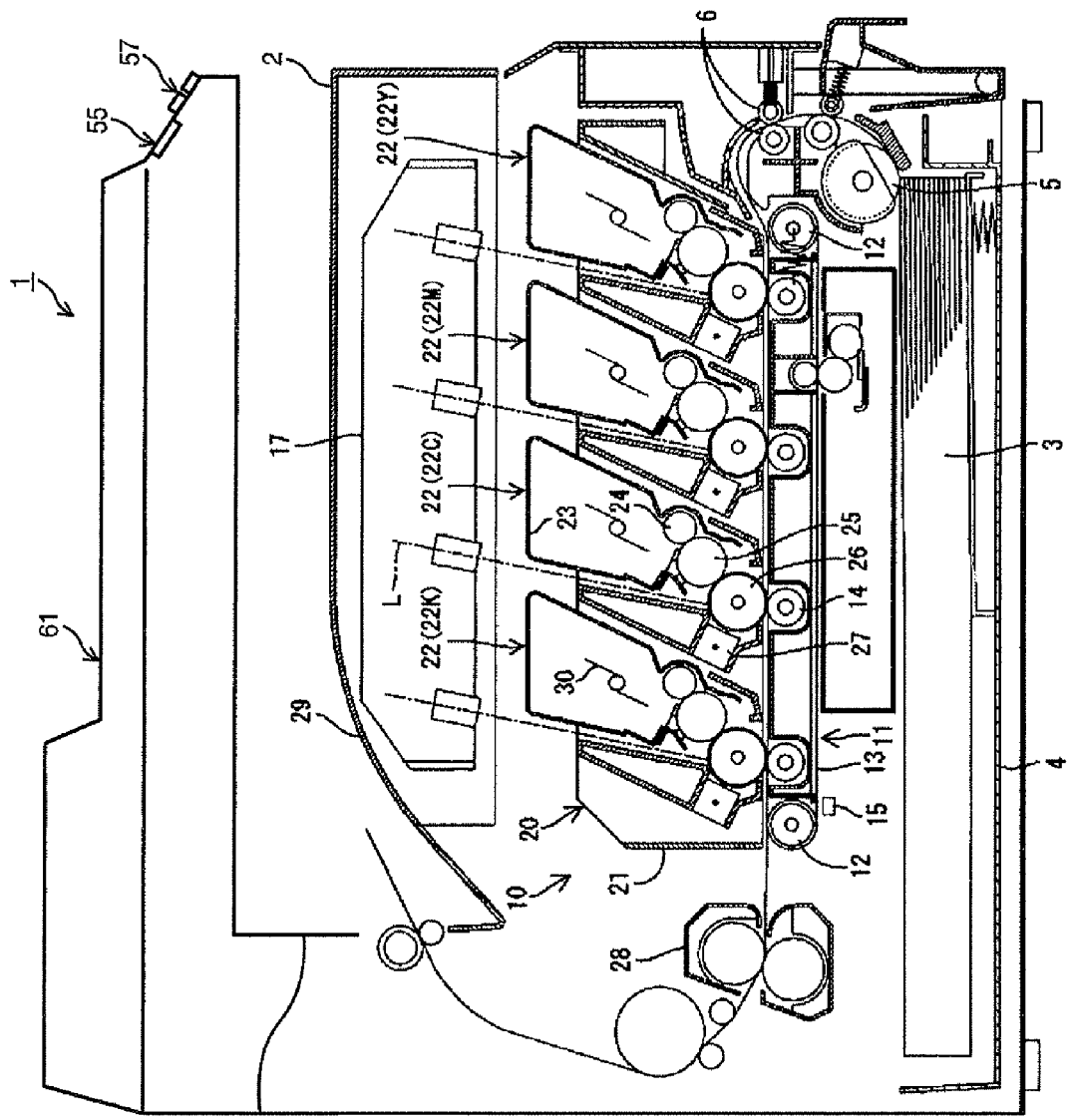
FIG. 1 is a side cross-sectional view showing a general configuration of a multifunction apparatus of an embodiment of the present invention.

A mechanical configuration of a print section 10 and its periphery of the multifunction apparatus 1 is now mainly described, and explanations for a mechanical configuration of a reading section 61 and that of a facsimile section 63 (see FIG. 2) are omitted. FIG. 1 is a side cross-sectional view showing a general configuration of the multifunction apparatus of the exemplary embodiment of the present invention. A right side of FIG. 1 is taken as a front in the following descriptions.

The multifunction apparatus 1 includes a main unit casing 2, and a feed tray 4 on which sheets 3 serving as recording mediums are to be stacked is positioned at the bottom of the main unit casing 2. A sheet feed roller 5 is placed at an upper position above a front end of the feed tray 4. The sheet 3 placed at the highest position within the sheet feed tray 4 is fed to a registration roller 6 along with rotation of the sheet feed roller 5. After having made a correction to oblique travel of the sheet 3, the registration roller 6 transports the sheet 3 to a position on a belt unit 11 of the print section 10.

The print section 10 includes the belt unit 11, a scanner section 17, a process section 20, a fixing section 28, etc.

The belt unit 11 has a configuration in which a belt 13 made of polycarbonate, etc, is stretched between a pair of front and rear support rollers 12. The belt 13 is driven to transport the sheet 3 on the belt 13 in a rearward direction. Transfer rollers 14 are placed inside the belt 13 at positions opposing respective photosensitive drums 26 of a process section 20 (described later) with the belt 13 sandwiched therebetween. A sensor 15 for detecting a test pattern generated on the belt 13 is additionally provided so as to oppose the surface of the belt 13.

The scanner section 17 irradiates surfaces of the respective photosensitive drums 26 with corresponding laser beams L of respective colors emitted from laser emission sections (not shown).

The process section 20 includes a frame 21 and four development cartridges 22 (22Y, 22M, 22C, and 22K) that are removably attached to the frame 21 and that correspond to; for instance, four colors (yellow, magenta, cyan, and black). Each of the development cartridges 22 includes a toner storage chamber 23 that stores toner of each color serving as a developing agent, a supply roller 24, a development roller 25, an agitator plate 30, etc. The frame 21 is provided with the photosensitive drums 26 and electrifiers 27 of scorotoron type in correspondence with the respective development cartridges 22.

Toner released from the toner storage chamber 23 by rotation of the agitation plate 30 is supplied to the development roller 25 by means of rotation of the supply roller 24. The toner is at this time positively charged by friction between the supply roller 24 and the development roller 25. The surface of the photosensitive drum 26 is first positively electrified in a uniform manner by the electrifies 27 along with rotation of the photosensitive drum 26. Subsequently, the surface is exposed to the laser beam L originating from the scanner section 17 to generate an electrostatic latent image corresponding to an image to be produced on the sheet 3. Subsequently, the toner on the development roller 25 is supplied to the surface of the photosensitive drum 26 by rotation of the development roller 25, whereby the electrostatic latent image is made visible. In the middle of the sheet 3 passing between the photosensitive drum 26 and the transfer roller 14, the toner image held on the surface of the photosensitive drum 26 is then transferred to the sheet 3 by a transfer bias voltage applied to the transfer roller 14.

The belt unit 11 transports the sheet 3 subjected to transfer operation to a fixing unit 28, where the toner image transferred onto the sheet 3 is thermally fixed. The sheet 3 subjected to thermal fixing is ejected onto an output tray 29 provided on an upper surface of the main unit casing 2.

Electrical Configuration of the Multifunction Apparatus

Figure 2:
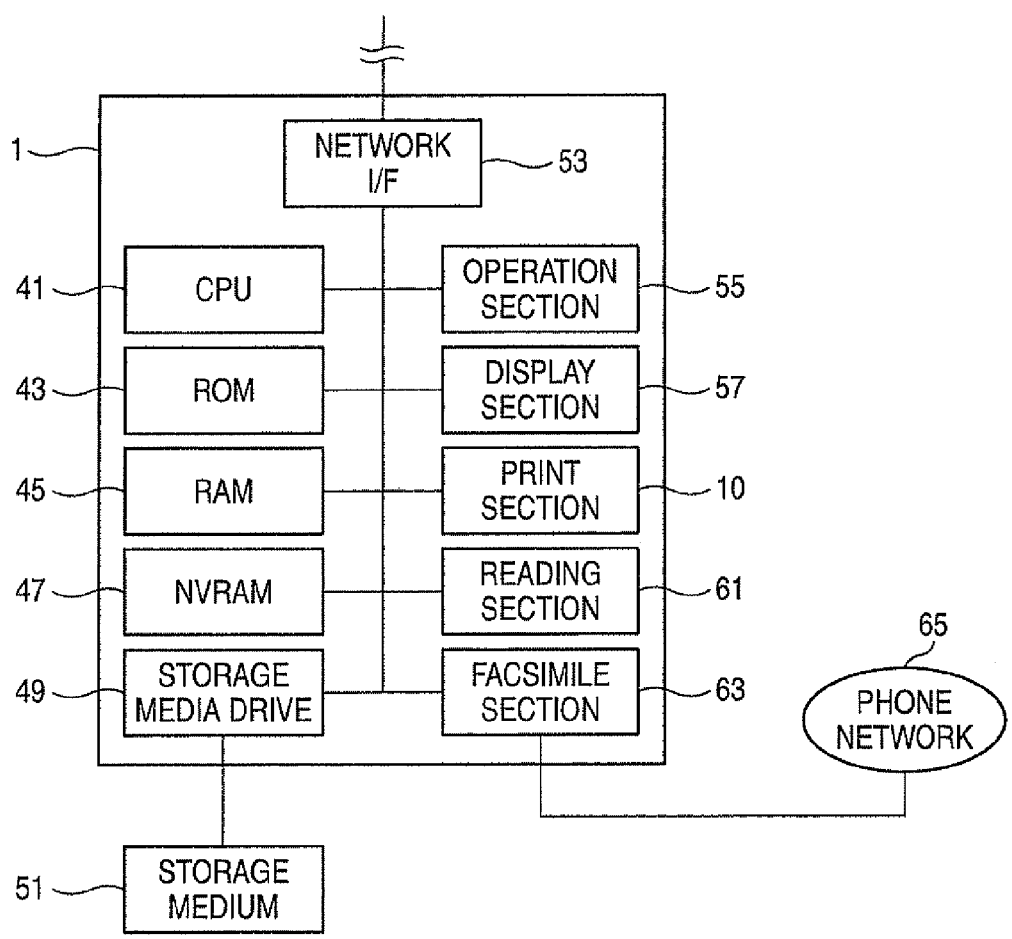
FIG. 2 is a schematic block diagram showing an electrical configuration of the multifunction apparatus.

FIG. 2 is a general block diagram showing an electrical configuration of the multifunction apparatus. The multifunction apparatus 1 has a CPU 41, ROM 43, RAM 45, NVRAM 47 (nonvolatile memory), a storage media drive 49, a network interface 53, an operation section 55, a display section 57, the print section 10, the reading section 61, the facsimile section 63, and others.

A program for controlling basic operations of the multifunction apparatus 1 is stored in the ROM 43. Pursuant to the program read from the ROM 43, the CPU 41 controls operation of the multifunction apparatus 1 while storing processing results in the RAM 45 and the NVRAM 47.

The operation section 55 includes a plurality of buttons and allows the user to perform various input operations, such as instruction for the initiation of printing operation. The display section 57 includes a liquid-crystal display and lamps and can indicate various setting screens, operating statuses, etc.

The reading section 61 reads an image from an original, etc., set at a predetermined read position (not shown) and generates image data pertaining to the image. At this time, the user places an original, etc., on the reading section 61; selects a function which the user desires to use by way of the operation section 55 while checking a display on the display section 57; and presses a start button included in the operation section 55, thereby making a request for implementing the selected function.

When a scan function is implemented, the CPU 41 converts the image data into a PDF file, or the like, and stores the file into the RAM 45, the NVRAM 47, or a storage medium 51. When copy function is implemented, the CPU 41 sends the image data to the print section 10, thereby causing the print section to perform print processing.

When the facsimile function is performed, the CPU 41 sends the image data generated by the read section 61 to the facsimile section 63; modulates the image data into an image signal that can be transmitted to a telephone network 65; and transmits the image signal to an external facsimile (not shown) connected to the telephone network 65. The facsimile function includes a transmission function and a receiving function of a facsimile. In the present embodiment, the facsimile function that the user can select is the transmission function of the facsimile. The receiving function is performed whenever an image signal is transmitted to the facsimile section 63 from the external facsimile (not shown) connected to the telephone network 65. A received image signal is converted into print data that can be printed by the print section 10, and the print processing is performed. In the present embodiment, when restrictions are imposed on utilization of the facsimile function, the transmission function is restricted, but the receiving function is not restricted.

When the storage media drive 49 is connected to the storage medium 51, the storage media drive 49 becomes able to accept a request for performing direct printing by reading information stored in the storage medium 51. Direct printing is a function of reading image data, which is desired to be printed, etc., from the storage medium by connecting to the storage media drive 49 and of directly causing the print section 10 of the multifunction apparatus 1 to print the image data specified by the user through the operation section 55, etc., without involvement of a computer.

The network interface 53 is connected to an external computer or server by way of a communication line, to thus become able to establish mutual data communication.

Print Preparation Operation

The color shift correction will now be described as example print preparation operation. The color shift correction is print preparation operation required to keep print quality of a color print. During the color shift correction operation, test patterns of respective colors are printed on the belt 13; positions of the test patterns are measured by means of the sensor 15, to thus determine amounts of shift in transfer positions for the respective colors; and exposure timing of the scanner section 17 (i.e., an exposure position with reference to the photosensitive drum 26) is adjusted in accordance with amounts of shift.

Although the present embodiment shows operation for correcting a color shift as example print preparation operation, the present invention can also be applied, as the print preparation operation, to density correction, fixing unit temperature adjustment, idling, etc. For instance, density correction is performed by printing a test pattern (a density patch) on the belt 13, measuring the density of the pattern by means of the sensor 15, and controlling the amount of toner transferred to the sheet 3 in accordance with a result of measurement.

Fixing unit temperature adjustment is for controlling energization of a heater (not shown) in the fixing unit 28, thereby adjusting the temperature of a fixing roller (not shown) of the fixing unit 28 to a predetermined fixing temperature.

Idling is for driving the agitation plate 30 in the toner storage chamber 23, to thus agitate toner in the toner storage chamber 23 so that toner can properly be supplied to the development roller 25 by means of the supply roller 24.

Timing for Performance of Print Preparation Operation

Timing for performance of the print preparation operation will now be briefly described, and detailed descriptions will be provided later. When performing a function not involving printing operation, the multifunction apparatus 1 of the embodiment performs the print preparation operation, thereby reducing the chance of the print preparation operation being performed immediately before making of a print request. Timing for performance of the print preparation operation corresponds to a point in time when a determination is made as to whether or not an accepted execution request is a request for executing a function involving printing operation.

When restrictions are imposed on utilization of functions on a per-user basis, a multifunction apparatus capable of identifying a user performs the print preparation operation when a user restricted in connection with utilization of functions involving printing operation is identified.

The word "function involving printing operation" refers to a print function (a direct print function), a copying function, etc. In contrast, the word "function not involving printing operation" corresponds to a facsimile function (a facsimile transmission function) and a scan function.

Restriction on Utilization of Functions

Restrictions on utilization of functions and user identification are described by reference to FIGS. 4 and 5. FIG. 4 is an example display of information about restrictions on utilization of functions. FIG. 5 is a table pertaining to information about restrictions on utilization of functions for an individual user.

Restrictions on utilization of functions correspond to prohibition of utilization of a specific function among the functions belonging to the multifunction apparatus 1. For instance, as shown in FIG. 5, in the case of the multifunction apparatus 1 having a print function, a copying function, a facsimile function, and a scan function, a user C is inhibited from utilizing the print function and the copying function; is allowed to utilize the facsimile function and the scan function. Thus, restrictions are imposed on utilization of functions. In this case, since the print function and the copying function, which are functions involving printing operation, are prohibited, the user C is in a state of being restricted in terms of the functions involving printing operation.

In the present embodiment, a state in which restrictions are imposed on functions involving printing operation is a state in which both a print function and a copying function are prohibited. Specifically, the user C and a user D are restricted in connection with functions involving printing operation. If the print preparation operation is performed while a user, who is restricted in connection with utilization of functions involving printing operation, utilizes the multifunction apparatus 1, the print preparation operation can early be completed by at least an amount corresponding to the time during the multifunction apparatus is utilized. The print preparation operation is performed immediately before performance of the print processing, and a time during which printing operation waits can correspondingly be reduced.

In the present embodiment, in order to restrict utilization of functions, an administrator registers users, thereby generating a table, such as that shown in FIG. 5, that brings user identification information in correspondence with function utilization restriction information. User registration can be performed on an individual basis or a group basis.

For instance, an ID and a password (example information for identifying a user), are used as user identification information. A table includes IDs and passwords input as user identification information by the administrator by way of the operation section 55, as well as including as function utilization restriction information circles assigned to functions permitted to be utilized and crosses assigned to functions prohibited from being utilized. The table is thus stored in the RAM 45, the NVRAM 17, etc.

Process of Performing Print Preparation Operation

Figures 3, 3A, 3B:
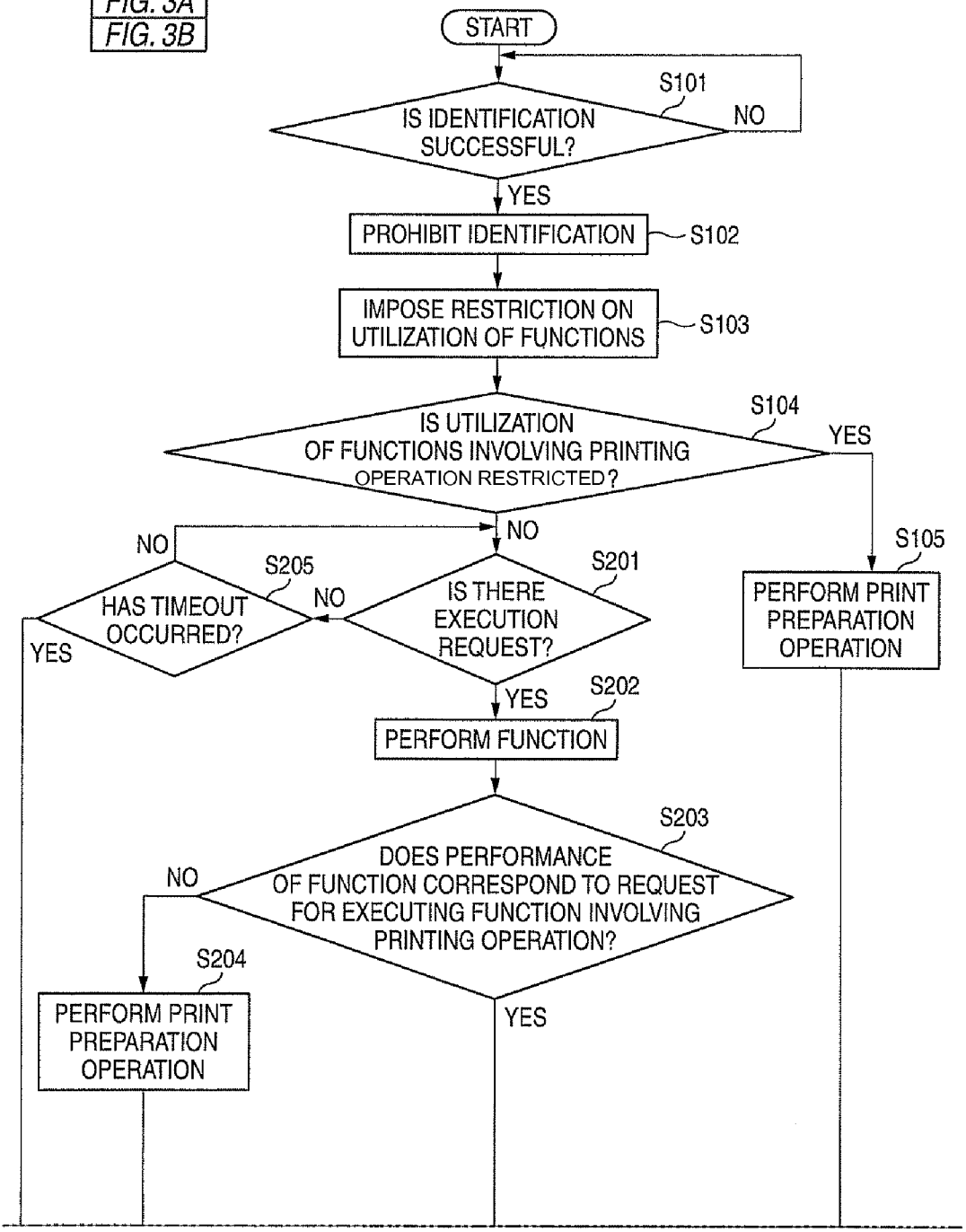
FIG. 3 is a flowchart of print preparation operation.
Figure 3B:
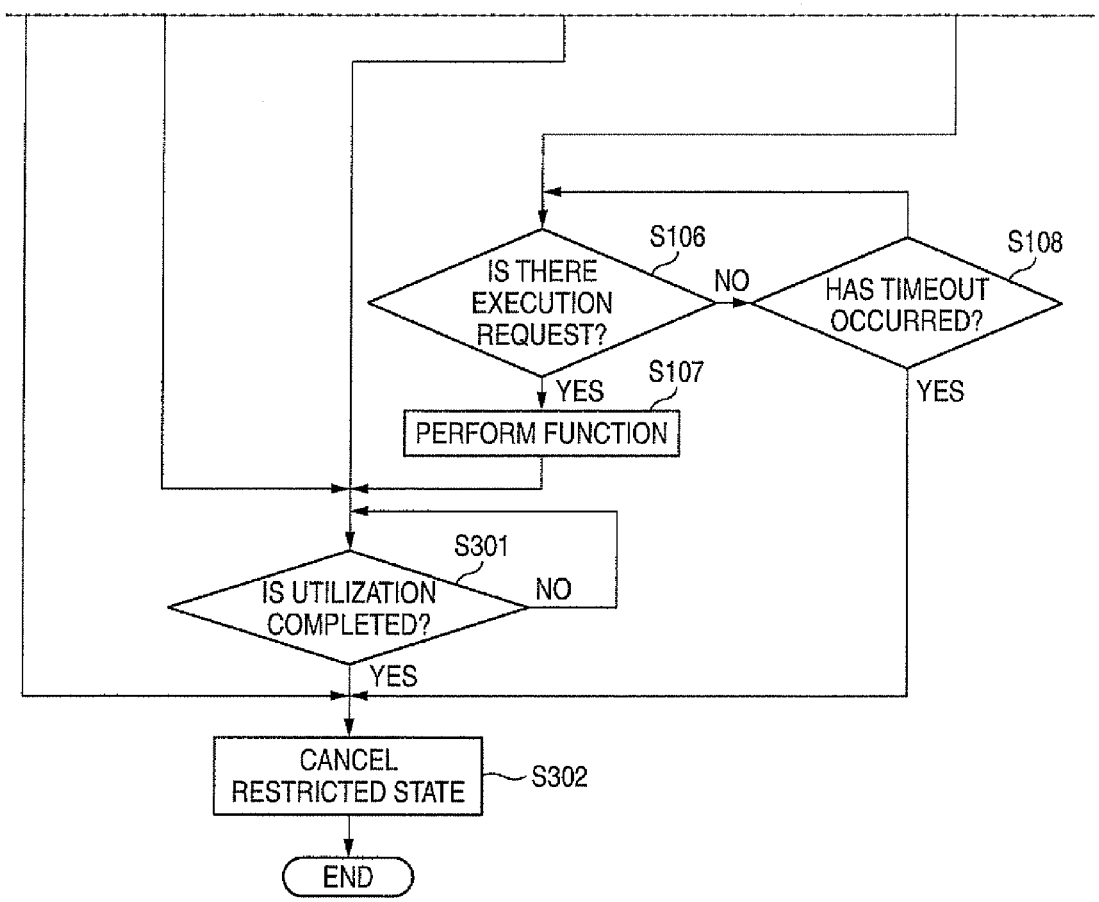

A process for performing the print preparation operation is now described with reference to FIG. 3. FIG. 3 is a flowchart of the print preparation operation. When power of the multifunction apparatus 1 is turned on, the CPU 41 performs processing of the flow chart shown in FIG. 3.

In S101, when an ID and a password are input to the operation section 55, the CPU 41 (an example identification section) identifies a user, and processing pertaining to S101 is repeated until identification becomes successful (NO in S101). In the present embodiment, the multifunction apparatus is set in such a way that functions of the multifunction apparatus cannot be utilized until identification becomes successful. The multifunction apparatus may also be configured so as to allow some of the functions.

User identification is not limited to the ID and the password. Another method implemented by an IC card, biometrics, infrared communication, a storage medium, a two-dimensional barcode, and others, may also be used. Naturally, only a password may also be employed.

When an ID and a password are input to the operation section 55, the CPU 41 (an example identification section) verifies an ID and a password against a table that stores user identification information, such as that shown in FIG. 5. When a combination of an ID and a password input through the operation section 55 conforms to a combination of the ID and the password which are previously stored in the table, the determination is referred to be "successful user identification."

When user identification is successful in S101 (YES in S101), processing proceeds to S102 to prohibit user identification. In S103, function utilization restriction information about the thus-identified user is read by reference to the table, thereby imposing restrictions on utilization of functions. When the user is identified, a user name and function utilization restriction information, such as those shown in FIG. 4, are displayed on the display section 57.

Upon receipt of a request for executing a function whose utilization is prohibited, the CPU 41 (an example restriction section) discards the thus-accepted execution request. When user identification is prohibited, a reference will not be made to the table storing user identification information even if an ID and a password are input to the operation section 55. An error message will be displayed on the display section 57, and the input items will be erased.

In a restricted state, only a request for executing functions allowed for the identified user is accepted. Namely, among the functions of the multifunction apparatus, only the function which the identified user is allowed to execute is put in a state that the user can select and execute it.

In S104, a determination is made as to whether or not the user identified by the information read in S103 is restricted in connection with utilization of a function involving printing operation.

When utilization of both the print function and the copying function that are functions involving printing operation (YES in S104) is restricted, processing proceeds to S105, where; for instance, the color shift correction, is carried out as the print preparation operation. Processing then proceeds to S106, the CPU 41 (an example execution request acceptance section) determines whether or not a request for executing a function is accepted.

When there is no execution request; namely, when an execution request is not accepted (NO in S106), processing proceeds to S108, and processing returns to S106 until a timeout occurs as a result of elapse of a predetermined period of time (NO in S108), and processing is repeated. When a timeout occurs (YES in S108) while an execution request is not accepted (NO in S106), processing proceeds to S302, where the restricted state is canceled, and processing of the flowchart is completed.

When there is an execution request; namely, when an execution request is accepted (YES in S106), the function accepted in S107 is performed, and processing proceeds to S301.

In S301, a determination is made as to whether or not utilization of the multifunction apparatus 1 is completed. When utilization of the multifunction apparatus 1 is not completed (NO in S301), processing pertaining to S301 is repeated. When utilization of the multifunction apparatus 1 is completed (YES in S301), processing proceeds to S302, where the restricted state is canceled, and processing of the flowchart is terminated.

When processing of the flowchart is completed, processing of the flowchart is again commenced. Processing of the flowchart is repeated on until power of the multifunction apparatus 1 is shut off.

In a case where the identified user executes a function not involving printing operation, even when the print preparation operation is concurrently performed, the print preparation operation does not affect the function currently being executed to wait. Accordingly, in the present embodiment, the print preparation operation is previously performed by utilization of duration of the restricted state, whereby a chance of the print preparation operation being carried out immediately before performance of the print processing can be diminished. Further, a time during which the user is forced to wait by the print preparation operation when performing the print processing can be reduced.

Further, when a predetermined condition is fulfilled, the restricted state is canceled. For instance, the CPU 41 (an example restriction section) determines a point in time when the identified user has finished performing copying function as an end of utilization of the multifunction apparatus 1, thereby cancelling the restricted state. When the user is identified and when a function execution request is not accepted within a predetermined period of time (e.g., one minute), elapse of the time may also be determined to be a timeout, and the restricted state may also be canceled. In this case, a wait time of the user who is awaiting utilization of the multifunction apparatus 1 can be diminished.

In the meantime, when utilization of both the print function and the copying function, which are the functions involving printing operation, is not restricted (NO in S104), processing proceeds to S201, where the CPU 41 (an example execution request accepting section) accepts an execution request. When the execution request is not accepted (NO in S201), processing proceeds to S205. Processing returns to S201 until a timeout occurs as a result of elapse of a predetermined period of time (NO in S108), and processing is repeated. When a timeout has occurred (YES in S205) while the execution request is not accepted (NO in S201), processing proceeds to S302 where the restricted state is canceled, and processing of the flow chart is completed.

When the execution request is accepted (YES in S201), the function accepted in S202 is performed, and processing immediately proceeds to S203. In S203, the CPU 41 (an example determination section) determines whether or not the accepted execution request is directed toward a function involving printing operation. When the execution request is directed to a print function or a copying function that is a function involving printing operation (YES in S203), processing proceeds to S301. In contrast, when the accepted execution request is not directed to the print function or the copying function that involves printing operation (NO in S203), processing proceeds to S204. The CPU 41 (an example execution section) concurrently performs; for instance, the color shift correction, as the print preparation operation along with performance of a function. Processing then proceeds to S301.

When the facsimile function or the scan function, which is a function not involving printing operation, is being executed, the print processing will not be forced to wait even if the color shift correction is concurrently performed, because the function does not involve the print processing. Further, since the print processing cannot be performed in the middle of execution of the print preparation operation, the print processing is forced to wait when a request for performing a function involving printing is accepted in the middle of performance of the print preparation operation.

Comparative Example Between Times for Waiting the Print Processing

Figure 6:
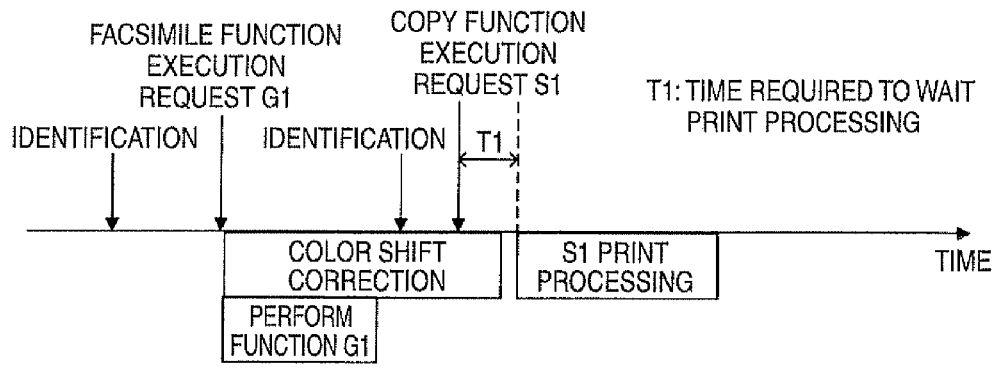
FIG. 6 is a timing chart pertaining to a first part of an embodiment.
Figure 7:
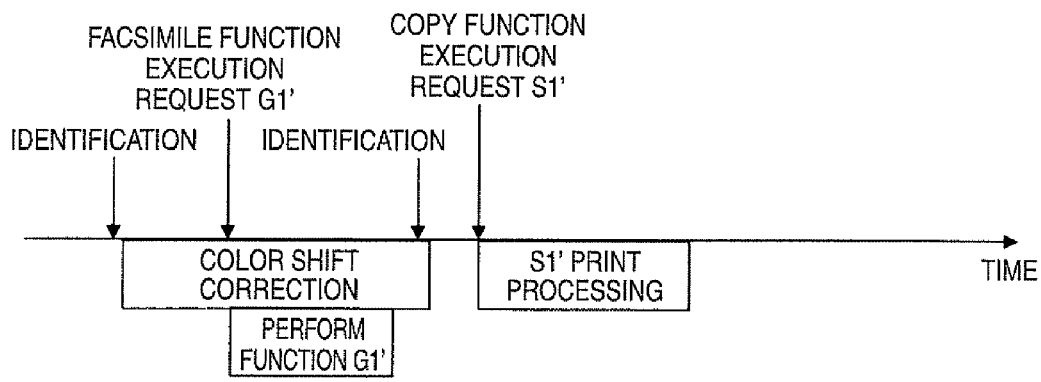
FIG. 7 is a timing chart pertaining to a second part of the embodiment.
Figure 8:
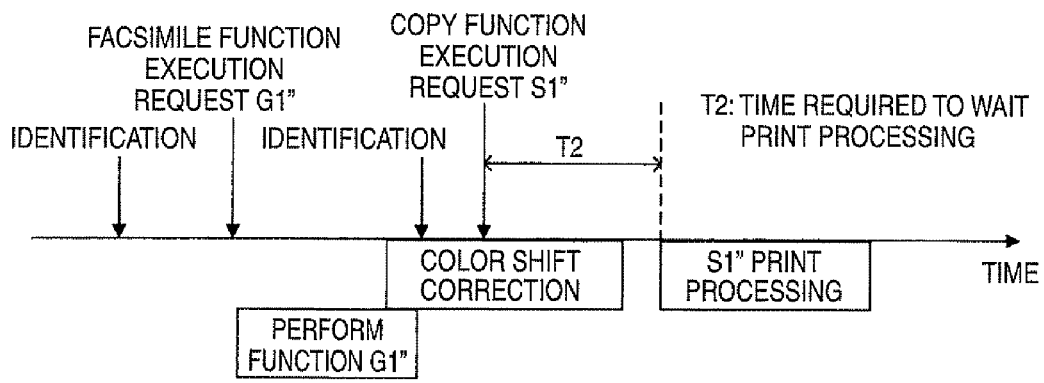
FIG. 8 is a timing chart pertaining to a related-art configuration.

A specific example of the present embodiment is described with reference to FIGS. 6, 7, and 8. FIG. 6 is a timing chart pertaining to Part 1 of the embodiment. FIG. 7 is a timing chart pertaining to Part 2 of the embodiment. FIG. 8 is a timing chart pertaining to a related-art configuration.

In the present embodiment, a time required to wait the print processing can be diminished by controlling timing at which the color shift correction is made. FIG. 6 shows a case where the color shift correction is carried out at timing when a request G1 for performing a facsimile function that is a function not involving printing operation is accepted. FIG. 7 shows a case where the color shift correction is performed at timing when a user is identified. FIG. 8 is a case where the color shift correction is performed at timing when a predetermined period of time has elapsed since previous the color shift correction was made.

According to timing at which the color shift correction is performed, a time required to wait the print processing changes as a result of the color shift correction being performed prior to requests S1, S1', and S1" for executing copying function.

Explanations are first given to the case shown in FIG. 6. A user who is not restricted in connection with utilization of a print function and a copying function is first identified. The request G1 for executing a facsimile function is accepted, and the color shift correction and processing pertaining to the function G1 are simultaneously performed. After performance of processing pertaining to the G1 function has been completed, a user who newly utilizes the multifunction apparatus 1 is identified. Before performance of the color shift correction is completed, a request S1 for executing a copying function is accepted. The print processing S1 requested by the user who newly utilizes the multifunction apparatus 1 is forced to wait until performance of the color shift correction is completed. A time T1 to wait the print processing S1 corresponds to duration from when the request S1 for performing a copying function is accepted until when performance of the color shift correction is completed.

Explanations are now given to the case shown in FIG. 7. Timings of execution requests G1' and S1' are the same as the timings of the execution requests G1 and S1 shown in FIG. 6. In the case shown in FIG. 7, the color shift correction is performed at timing when a user is identified. Therefore, at a point in time when the user who newly utilizes the multifunction apparatus 1 is identified and when the copying function execution request S1' is accepted, performance of the color shift correction is completed. Therefore, the print processing S1' can be performed without consumption of the time required to wait the print processing S1'. Even when a time required to perform the color shift correction is long and when a time required to wait the print processing S1' is consumed, the wait time can be reduced as compared with the wait time T1 described in connection with the case shown in FIG. 6.

Explanations are now given to the case shown in FIG. 8. Timings of the execution requests G1" and S1" are the same as the timings of the execution requests G1 and S1 shown in FIG. 6. Since the color shift correction is performed after a predetermined period of time has elapsed since previous the color shift correction was performed in the case shown in FIG. 8, the color shift correction is performed immediately before the user who newly utilizes the multifunction apparatus 1 is identified. In this case, the chance of the color shift correction being performed immediately before the print request S1″ made by the user who newly utilizes the multifunction apparatus 1 cannot be diminished. Accordingly, a time T2 for waiting the print request S1″ cannot be lessened.

When the print processing wait times of the respective cases are compared with each other, the wait time T2 cannot be diminished. However, the wait time T1 can be lessened by at least an amount corresponding to a period of time during which the function G1 is performed. In the case shown in FIG. 7, it is further possible to lessen a wait time as compared with the wait times T1 and T2.

Other Embodiments (1) In the present embodiment, when a user who is restricted in connection with utilization of functions involving printing operation is identified, the print preparation operation is performed. However, if users who are restricted in connection with utilization of functions involving printing operation are continually identified, unnecessary print preparation operation may be performed. Accordingly, the present invention can also be configured in such a way that the frequency of performance of the print preparation operation is set, to thus lessen the chance of performance of unwanted print preparation operation. When utilization of functions involving printing operation is determined to be restricted from user identification information about an identified user, the frequency of performance of the print preparation operation is set to a high level. The frequency of performance is determined by making a reference to; for instance, the number of printing operations, a period of time elapsed from performance of previous print preparation operation, etc.

When requests for executing functions involving printing operation are continually accepted, necessary print preparation operation may not be performed. Accordingly, the frequency of performance of the print preparation operation may also be set to a low level when utilization of functions involving printing operation is determined to be possible from user identification information about an identified user in the same manner as mentioned above.

(2) The present embodiment has described that the state in which utilization of functions involving printing operation is restricted corresponds to a state in which utilization of both the print function and the copying function is prohibited. However, the restricted state may also be a state in which utilization of at least one of the functions is prohibited. In this case, there is a case where the print preparation operation is performed immediately before the print processing. Hence, the history of usage of each of the functions may be recorded. When functions involving printing operation are hardly utilized, the print preparation operation may also be performed. Therefore, even in this case, the chance of the print preparation operation being performed immediately before the print processing can be diminished, so long as performance of a function not involving printing operation is accepted.

(3) The multifunction apparatus may also be configured so as to select the print preparation operation to be performed according to duration of a restricted state. The word "duration of a restricted state" means; for instance, a period from when a user is identified until when utilization of the multifunction apparatus 1 is completed. The print preparation operation includes; for instance, the color shift correction, density correction, fixing unit temperature adjustment, idling, etc, which differ from each other in terms of operation time. According to duration of a state in which an identified user is restricted, the print preparation operation is selected, whereby the print preparation operation conforming to the duration of the restricted state can be performed. Accordingly, since the print preparation operation is completed when the restricted state is canceled, a time during which the user who is allowed to utilize functions involving printing operation is forced to wait the print processing by the print preparation operation can be reduced. Further, an average time during which the users who are restricted in connection with utilization of functions involving printing operation undergoes restriction of the multifunction apparatus 1 may also be used as the time of a restricted state. An average time of a restricted state is computed from information about the history of utilization achieved before previous utilization. A predetermined period of time may also be used for the time of a restricted state.

(4) The present embodiment has provided a direct transfer color laser printer as the print section 10 of the multifunction apparatus 1. However, the present invention can also be applied to for instance, an inkjet printer as well as to an intermediate transfer laser printer, etc.

What is claimed is:

1. A multifunction apparatus comprising:
a print unit configured to print an image on a sheet;
a receiving section configured to receive user identification information; and
a controller configured to:
receive the user identification information via the receiving section;
identify a user according to the user identification information received by the receiving section;
determine whether the user identified by the user identification information is restricted from executing a function which uses the printing unit;
if it is determined that the user identified by the user identification information is restricted from executing the function which uses the printing unit: restrict printing operation of the print unit; and control the print unit to execute a print preparation operation; and
if it is determined that the user identified by the user identification information is not restricted from executing the function which uses the printing unit: allow printing operation of the print unit; and control the multifunction apparatus to execute the function that is not restricted;
wherein the print preparation operation corresponds to operation for correcting color shift.

2. The multifunction apparatus according to claim 1, wherein the controller allows printing operation of the print unit when the user finishes using the multifunction apparatus.

3. The multifunction apparatus according to claim 2, wherein the controller allows printing operation of the print unit when the executed function is completed.

4. The multifunction apparatus according to claim 2, wherein the controller allows printing operation of the print unit when a function has not been performed for a predetermined period of time since the restricted state is achieved.

* * * * *